(12) United States Patent
Callaway et al.

(10) Patent No.: US 9,639,895 B2
(45) Date of Patent: May 2, 2017

(54) DYNAMIC MARKET DATA FILTERING

(75) Inventors: Paul J Callaway, Chicago, IL (US); Dennis M Genetski, Porter, IN (US); Adrien Gracia, Chicago, IL (US); James Krause, Palatine, IL (US); Vijay Menon, Chicago, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 1389 days.

(21) Appl. No.: 11/847,954

(22) Filed: Aug. 30, 2007

(65) Prior Publication Data

US 2009/0063360 A1    Mar. 5, 2009

(51) Int. Cl.
*G06Q 40/00* (2012.01)
*G06Q 40/04* (2012.01)
*G06Q 30/02* (2012.01)
*G06Q 40/06* (2012.01)

(52) U.S. Cl.
CPC ......... *G06Q 40/04* (2013.01); *G06Q 30/0201* (2013.01); *G06Q 40/06* (2013.01)

(58) Field of Classification Search
CPC .................................................. G06Q 30/0201
USPC .......................................................... 705/37
See application file for complete search history.

(56) References Cited

U.S. PATENT DOCUMENTS

| | | | |
|---|---|---|---|
| 6,633,835 B1* | 10/2003 | Moran et al. | 702/190 |
| 6,898,692 B1* | 5/2005 | Cameron et al. | 712/22 |
| 7,299,277 B1 | 11/2007 | Moran et al. | |
| 7,584,141 B1* | 9/2009 | Andrews | 705/37 |
| 2003/0014462 A1 | 1/2003 | Bennett et al. | |
| 2003/0086515 A1 | 5/2003 | Trans et al. | |
| 2005/0050293 A1 | 3/2005 | Falk et al. | |
| 2005/0203826 A1* | 9/2005 | Farrell et al. | 705/37 |
| 2006/0268871 A1 | 11/2006 | Van Zijst | |
| 2007/0025351 A1 | 2/2007 | Cohen | |
| 2007/0027796 A1 | 2/2007 | Claus et al. | |

OTHER PUBLICATIONS

International Search Report from International Application No. PCT/US2008/073011 dated Nov. 5, 2008, 2 pages.
International Search Report for International Patent Application No. PCT/US2008/073015 dated Nov. 14, 2008.
Final Office Action issued Mar. 10, 2010 for U.S. Appl. No. 12/335,246.
Non-Final Office Action issued Aug. 7, 2009 for U.S. Appl. No. 12/335,246.

* cited by examiner

*Primary Examiner* — Edward Chang
(74) *Attorney, Agent, or Firm* — Banner & Witcoff, Ltd.

(57) ABSTRACT

Networks, systems and methods for dynamically filtering market data are disclosed. Streams of market data may be buffered or stored in a queue when inbound rates exceed distribution or publication limitations. Inclusive messages in the queue may be removed, replaced or aggregated, reducing the number of messages to be published when distribution limitations are no longer exceeded.

6 Claims, 5 Drawing Sheets

DYNAMIC MARKET DATA FILTERING

FIELD OF THE INVENTION

The present invention relates to distribution of data from a continuous source. More particularly, the invention relates to the distribution of continuous market data.

DESCRIPTION OF THE RELATED ART

Modern exchanges process and distribute large volumes of market data. The market data may be associated with orders entering the market, executed transactions, pending orders, cancelled orders, state of the market, market limits, best prices for a period and other data related to market conditions and events. The distribution of large volumes of market data consumes processing resources and transmission bandwidth.

Some systems distribute market data without consideration to bandwidth limitations and/or constraints. The bandwidth limitations may be due to hardware and/or software limitations of the exchange that is distributing the market data, the limitations of the mode of transmission of the data, and/or hardware and/or software limitations at the recipient's end. During normal flow of market data, the amount of bandwidth that is available for the market data communication is sufficient to disseminate the market data to the recipients. However, the occasional transmission of a burst of data beyond bandwidth limitations may be required. If a peak or burst of data exceeds the maximum message rate that can be transmitted, there will be an increased latency in the messages delivery/reception. It may also be possible that some messages are not transmitted altogether, resulting in an information loss or gap during peaks.

Other systems may provide a time-driven filter to the market data. These time-driven approaches require timing mechanisms and clocks that require processing resources and introduce latency in the delivery of the market data. The time driven filters also do not provide event driven filtering.

BRIEF SUMMARY OF THE INVENTION

By way of introduction, dynamic market data filtering systems, apparatuses, and/or methods provide a natural filtering for market data. Embodiments for may be achieved by one or more devices, systems, networks, and/or processes for communicating, transmitting, submitting, receiving, entering, managing, administering, and/or presenting market data.

The dynamic market data filter may be driven by a difference between an inbound data rate and possible, feasible or achievable outbound data rates. During instances when inbound market data rates, such as data from a match engine, do not exceed the outbound bandwidth, the dynamic market data filtering allows the market data to be transmitted using conventional market data transmission technologies. In the instances when the inbound rate exceeds the achievable outbound data rates, such as during a spike, the dynamic filtering may replace older data with newer or newly received data without transmitting the older data. The dynamic market data filter may compare the older data and new data to identify which of the older data may be aggregated into the newer data.

The dynamic market data filter may apply to data associated with financial transaction. For example, the dynamic market data filtering may apply to streams of market data for financial derivatives, including options, futures contracts, swaps, swaptions and exchange listed over-the-counter products. Additionally or alternatively, the dynamic market data filtering may apply to market data streams for any equities, securities or other investment vehicles.

The dynamic market data filter may also apply to other streams of data such as streams of data where new data may replace older data that has been bottlenecked. For example, streaming data used by global positioning satellite systems and auto-theft deterrent systems may use the dynamic market data filtering concepts. In this embodiment, data may be sent to a user that includes various data, including for example, location, duration at a location, direction, data associated to the surroundings of the user (including closest restaurants, hotels, banks, grocery stores, etc.). Each of the pieces of data may be sent in an individual packet that can be streamed. Each packet is sent as the information is attained.

An entity may require the location of the user and can attain that data utilizing satellite to determine positions. In some cases, it is contemplated that the location is the most desirable piece of information. In such cases, all of the associated packets of information are not necessarily sent before the next packet of information regarding location is sent.

In another embodiment in accordance with the present invention, any continuous data provided to a business unit can be dynamically filtered. This embodiment is useful, for example, when continuous data dissemination requires more bandwidth during the peak than is available to the recipient. In such instances, the recipient only receives a portion of all of the data being sent. As such, a dynamic data filter which can remove older, replace older with newer data aggregate data and/or otherwise provide the newer data in the stream. This is because during an information burst, i.e., where larger than normal amounts of information are being sent, it may be more important to deliver the new data than to deliver all of the data.

An example of a dynamic market data filter may include a system within a market data environment. The system typically includes a sequencer component which disseminates market data to the client. The system has enough bandwidth to send the client all of the market data information; however, not all clients have enough bandwidth to receive all of the information when an information burst occurs. This will result in information loss during bandwidth peaks. The sequencer component passes on messages to the client as soon as it receives them.

When too much information is available to be transmitted or otherwise published, i.e., during an information peak or burst, the older data may be filtered out from the sequencer component to reduce the bandwidth requirement during peaks. The filtering is such that pre-determined data can be discarded from the information being sent to the client in the event of an information burst. In an embodiment, the dynamic filtering effectively discards data that would not otherwise be discarded and moves data up in a queue that would have otherwise been sent to the back of the queue.

An example of a method for dynamically filtering market data may include generating a market data stream based on market events. The market data stream includes individual packets of information that can be categorized to form categories of information. Those categories of information can be designated as preferred. The market data stream can then be routed through a message queue to one or more subscribers. It is then determined whether each of the one or more subscribers is capable of receiving the entire market data stream. If each of the one or more subscribers is capable of receiving the entire market data stream, the market data stream is sent through a message queue to the one or more subscribers. If each of the one or more subscribers is not capable of receiving the entire market data stream, the market data stream is dynamically filtered and then sent through a message queue to the one or more subscribers.

The foregoing summary is provided only by way of introduction. The features and advantages of the dynamic market data filter systems may be realized and obtained by the instrumentalities and combinations pointed out in the claims. Nothing in this section should be taken as a limitation on the claims. Additional features and advantages will be set forth in the description that follows, and in part will be obvious from the description, or may be learned by practice of the present invention.

BRIEF DESCRIPTION OF THE DRAWINGS

Examples of dynamic market data filter systems, methods and apparatuses are described with reference to the accompanying drawings, in which components, features and integral parts that correspond to one another each have the same or similar reference number, where.

DETAILED DESCRIPTION OF THE INVENTION

Figure 1:
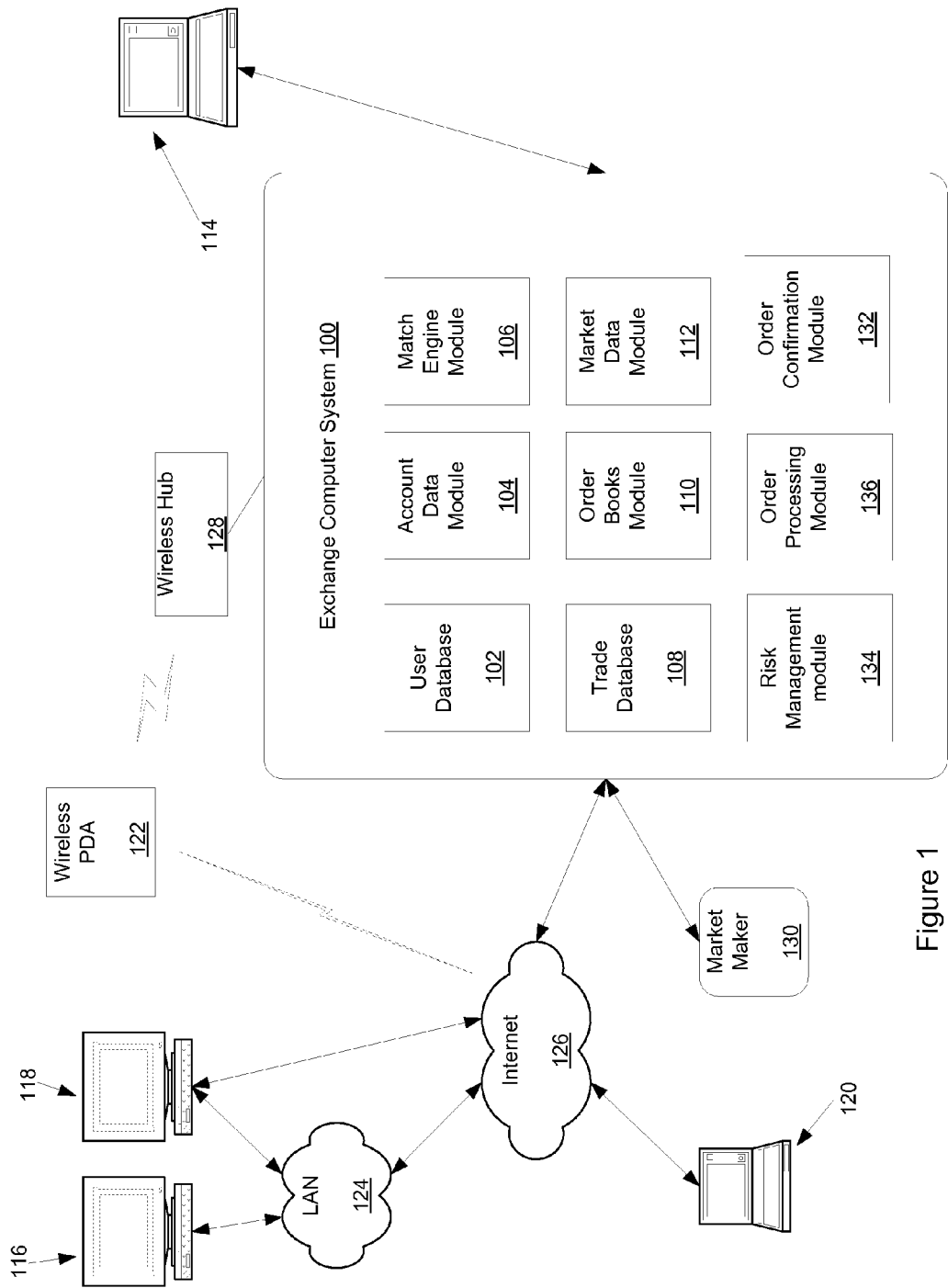
FIG. 1 shows a computer network that may be used with an implementation of dynamic market data filtering in accordance with the present invention.

The dynamic market data filter systems, methods and apparatuses may take physical form in certain parts and steps, embodiments of which will be described in detail in the following description and illustrated in the accompanying drawings that form a part hereof.

Dynamic market data filter systems, methods and apparatuses may be achieved in many different forms, formats, and designs and should not be construed as limited to the exemplary embodiments set forth herein. Embodiments may transmit, distribute, communicate, administer, manage, display, store, and/or confirm market data. Embodiments may take the form of one or more devices, systems, distributed networks, data processing systems, processes, electronic hardware, computer software, firmware, including object and/or source code, and/or combinations thereof. Embodiments may be stored on computer-readable media installed on, deployed by, resident on, invoked by and/or used by one or more data processors, controllers, computers, clients, servers, gateways, networks of computers, and/or any combinations thereof. The computers, servers, gateways, may have one or more controllers configured to execute instructions embodied as computer software.

An exemplary embodiment may include software stored and executed on one or more match engines, or servers, having electronic components configured to carry out instructions according to a computer program stored on a computer-readable storage medium, such as a memory, hard disk, CD-ROM, optical storage device, magnetic storage device and/or combinations thereof to dynamically filter stream of data, such as market data for financial instruments. A match engine may provide as output, data associated with market events and conditions. A market event and/or condition may be an executed transaction, a newly entered order, a cancelled order and the like. The data generated by the match engine generally takes the form of streaming, or a substantially constant stream of data. The data is provided at a market data rate, which may be conventionally measured in megabytes per second. Other metrics also may be used to measure market data rate, including messages per second, packets per second or any other measure that may be used to measure an amount of data transfer with respect to time.

The market data from a match engine may be provided to a market data routing module. The market data router receives the market data from the match engine and distributes the data over one or more market data channels. The market data may be received at a market data rate that may vary according to any number of parameters, including time, market events, market conditions and/or market volume. When the market data from the match engine is received at a rate that is beyond a capability of a recipient to receive all of the market data, the market data router may buffer the incoming market data. For example, a threshold may be set according to a capability to publish market data to recipients of the market data. The threshold may be associated with the limitations or capability of one or more recipients to receive market data. The threshold may be a limit of the ability of a recipient to receive the market data and/or a communication, transmission and/or distribution limitation. When the market data rate is beyond the threshold, the incoming market data may be placed in a buffer or a queue for transmission when there is sufficient bandwidth to transmit the market data.

While the market data populates the queue, the market data router will evaluate the incoming messages. The router may evaluate the newly entered market data received at the router to identify whether it may be aggregated with or replace older market data, or market data that previously entered the queue. Messages that may be replaced are removed from the queue, and those messages that may be aggregated are combined into a single message and scheduled for transmission by the router. When the bandwidth becomes available, the messages in the queue are distributed by the market data router.

Aspects of dynamic market data filtering may be implemented with electronic computing devices and networks configured to allow users to receive and exchange trading information. An exemplary trading network environment for implementing dynamic market data is shown in FIG. 1. Although described herein with respect to market data, it is contemplated that the present invention is applicable to the reception of any stream of data to a business unit.

As shown in FIG. 1, an exchange computer system 100 receives orders and transmits market data related to orders, trades and related information. Exchange computer system 100 may be implemented with one or more mainframes, servers, gateways, controllers, desktops or other computers. In an embodiment, a computer device uses a 64-bit processor, although it is contemplated that processors having 128 or more bits of processing capability may be used.

A user database 102 includes information identifying traders and other users of exchange computer system 100.

Data may include user names and passwords. An account data module 104 may process account information that may be used during trades.

A match engine module 106 is included to match orders, or bids/offers and/or buys/sells, for a financial instrument. The financial instrument may be any investment vehicle including stocks, bonds, commodities, T-bills, securities, future contracts, ETF's, options, combinations thereof and other derivatives and equities. Match engine module 106 may be implemented with software that executes one or more algorithms for matching orders.

A trade database 108 may be included to store information identifying trades and descriptions of trades. In particular, a trade database may store information identifying or associated with the time that a trade took place and the contract price. Other information may also be associated, including the number of shares, the time the trade order was placed and other such information.

An order book module 110 may be included to compute or otherwise determine current order prices. A market data module 112 may be included to collect market data and prepare the data for transmission to subscribers. A risk management module 134 may be included to compute and determine a subscriber's risk utilization in relation to the subscriber's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. The computer devices 114, 116, 118, 120 and 122 may include one or more central processors, or controllers, that control the overall operation of the computer. The computer devices 114, 116, 118, 120 and 122 may include one or more system buses that connect the central processor to one or more components, such as a network card or modem. The computer devices 114, 116, 118, 120 and 122 may also include interface units and drives for reading and writing data or files. Depending on the type of computer device, a user may interact with the computer with devices such as a keyboard, pointing device, mouse, microphone, pen device, voice recognition system, gestural recognition device, optical recognition, biometric recognition system, artificial intelligence, or other currently known or later developed data input device.

Computer device 114 is shown communicatively connected to exchange computer system 100. Exchange computer system 100 and computer device 114 may be connected via a T1 line, a common local area network (LAN) a wireless communication device or any other mechanism for communicatively connecting computer devices. Computer device 114 is shown connected to a radio 132. The user of radio 132 may be a trader or exchange employee. The radio user may transmit standard and/or conditional orders or other information to a user of computer device 114. The user of computer device 114 may then transmit the trade or other information to exchange computer system 100.

Computer devices 116 and 118 are coupled to a local area network ("LAN") 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for communicatively connecting a computer device to the Internet.

One or more market makers 130 may maintain a market by providing substantially constant bid and offer prices for a financial instrument, such as a derivative, security, commodity, or equity product, to exchange computer system 100. Exchange computer system 100 may also exchange information with other trade engines, such as trade engine 138. Numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Additional servers, computers, handheld devices, personal digital assistants, telephones and other devices may also be connected to exchange computer system 100. Moreover, the topology shown in FIG. 1 is merely an example and that the components shown in FIG. 1 may be connected by numerous alternative topologies.

Figure 2:
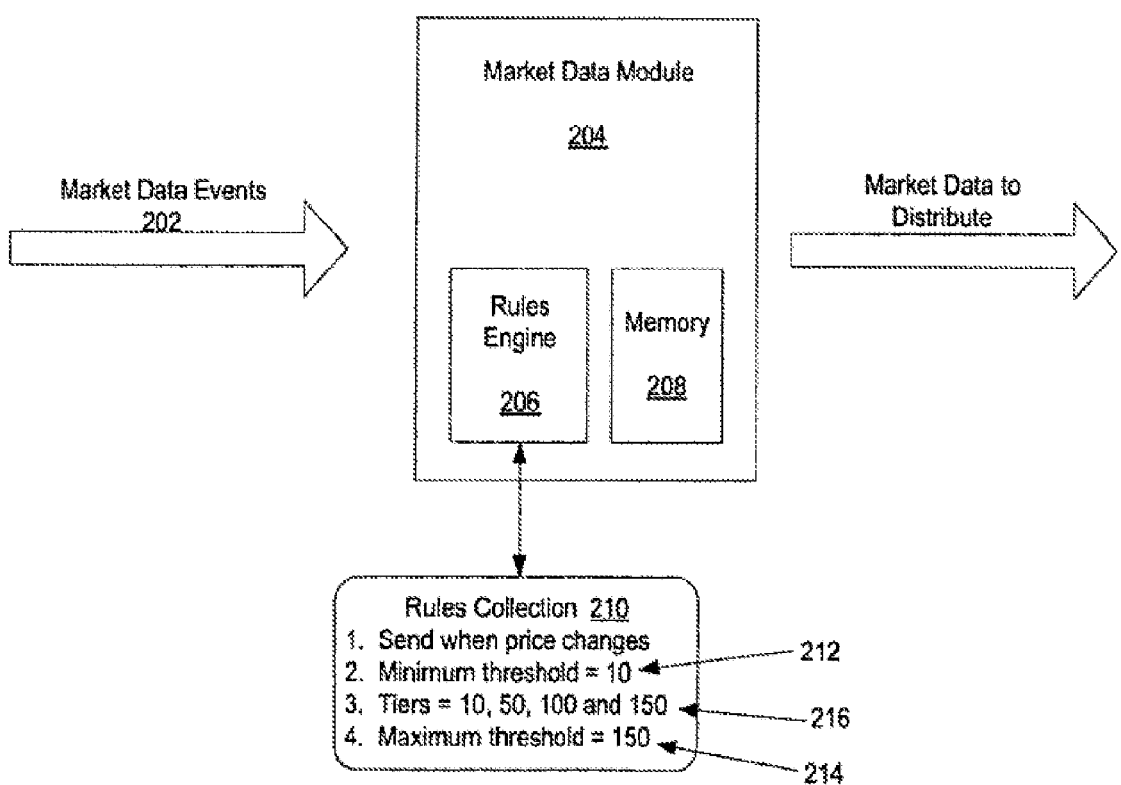
FIG. 2 shows a system for distributing market data using dynamic filtering in accordance with the present invention.

FIG. 2 shows a system for distributing market data in accordance with an exemplary embodiment of dynamic market data filtering. Data associated with market events 202 are received at a market data module 204. Market events 202 may include or correspond to new orders, cancellation of orders, matching of orders, changes in the state of the market, market volume, market statistics or any other event or condition that typically results in an exchange or other entity distributing market data. In one embodiment of the invention market data module 204 performs functions similar to that of market data module 112 (shown in FIG. 1). Market data module 204 may include a rules engine 206 and a memory 208. Rules engine 206 may be implemented with a conventional rules engine and may be linked to a rules collection 210.

In an alternative or additional embodiment, rules engine 206 is linked to multiple rules collections. Each rules collection may correspond to a class of service purchased by subscribers of market data. For example, a first rules collection may utilize four tiers, a second rules collection may utilize ten tiers and a third rules collection may utilize twenty tiers. An exchange or other entity distributing market data may allow subscribers to decide which level of service they desire. A higher number of tiers corresponds to a higher service level and may be priced accordingly. Returning to FIG. 2, rules collection 210 may be used to implement a market data tier structure.

Various embodiments may also use a dynamic tier structure. For example, the granularity of the tiers may be a function of market data bandwidth consumption or trading activity. Tiers may also vary along a distribution path or within a single entity, such as an exchange.

FIG. 2 is an exemplary embodiment for implementing aspects of dynamic market data filtering. In an alternative or additional embodiment, a microprocessor may be programmed with computer-executable instructions to perform the functions described above. In another alternative embodiment of the invention, an application specific integrated circuit (ASIC) may be utilized. In other embodiments some or all of the functions performed by market data module 204 may be performed by one or more of the modules shown in exchange computer system 100 (shown in FIG. 1).

Figure 3:
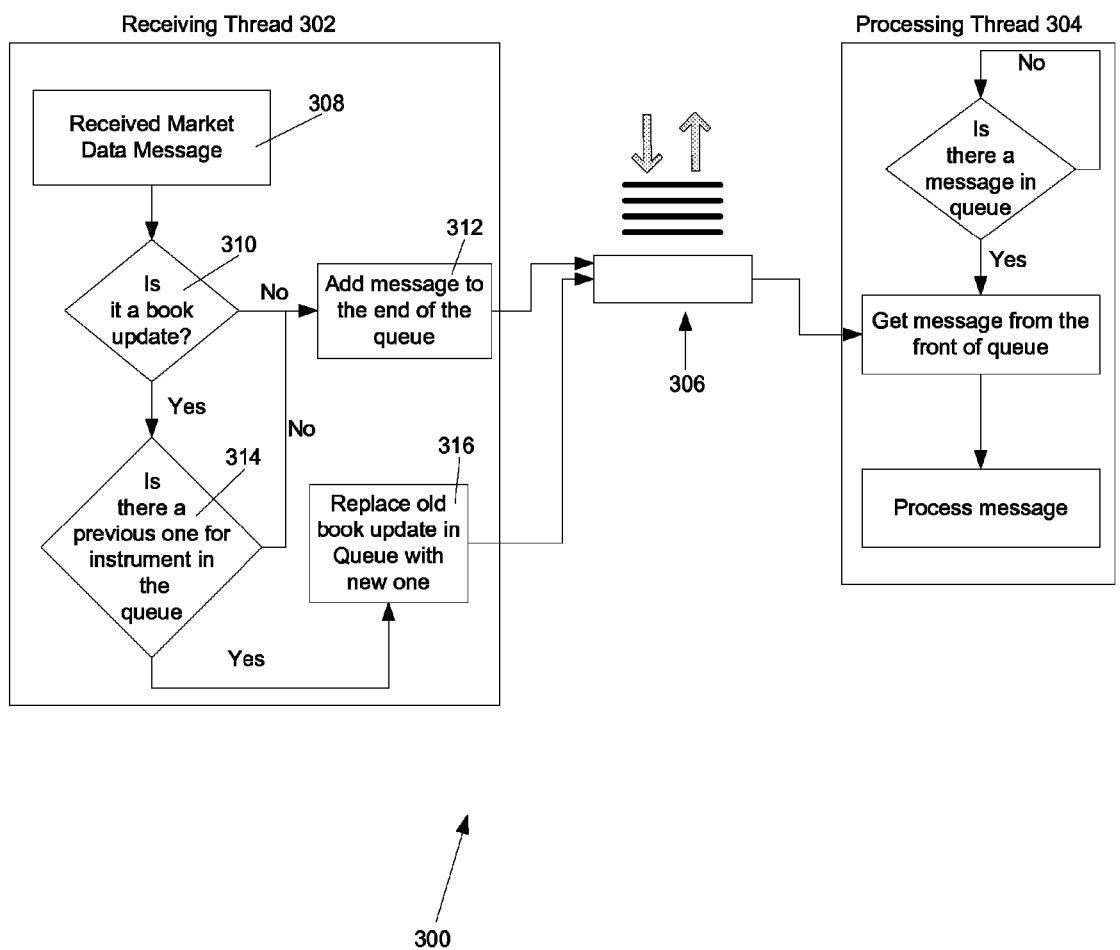
FIG. 3 illustrates another system for distributing market data using dynamic filtering in accordance with the present invention.

Embodiments in accordance with the present invention use at least one thread to control to receive, process and publish messages. FIG. 3 illustrates an example for event based filtering 300 in accordance with an embodiment of the invention. A receiving thread 302 receives messages and a processing thread 304 processes and publishes messages. The receiving thread 302 and the processing thread 304 may share a message queue 306. The receiving thread 302 places or replaces messages in the message queue 306. The processing thread 304 receives and processes the messages as they are placed in the message queue 306. Preferably, the processing thread 304 receives and processes the messages at a rate no higher than a pre-configured maximum. If a peak of messages occurs (i.e., there are too many messages in the message queue 306) a backlog of messages builds up in the message queue 306 and the older data is replaced by newer data before it is published.

This embodiment uses the rate of the inbound stream of messages to naturally trigger filtering implicitly. Although compatible to do so, it is not necessary to measure the inbound rate or to cache a complete view of all of the data elements in the stream (a cache of all books, for instance). It is, however, contemplated that a complete cache view can be achieved after the filtration through back filtering, should that data be desired.

It is also contemplated that the outbound rate of messaging is at a fixed rate. Provided that the inbound rate of messaging is lower than the outbound rate of messaging, no pause is introduced. This differs from traditional timer-driven approaches, which tend to introduce unnecessary latencies in these cases.

As shown in FIG. 3, book update messages can be filtered. Although the example of the illustration is described with respect to book update messages, any category of messages can be filtered as would be appreciated by those of skill in the art and depending on the type of information desired. In a first instance, a market data message is received 308. Initially, the message is analyzed to determine if it is a book update message 310. If the message is not a book update message, it is added to the end of the message queue 312. If the message is a book update message, it is determined whether there is a previous instrument for that same book update. If there is not a previous instrument with the same book update, the message is added to the end of the message queue 312. If there is a previous instrument in the message queue for the same book update, the old book update in the message queue is replaced by the new one. It is also contemplated that in certain instances the old book update is aggregated with the new book update to update the book update with the contents of both messages.

Figure 4:
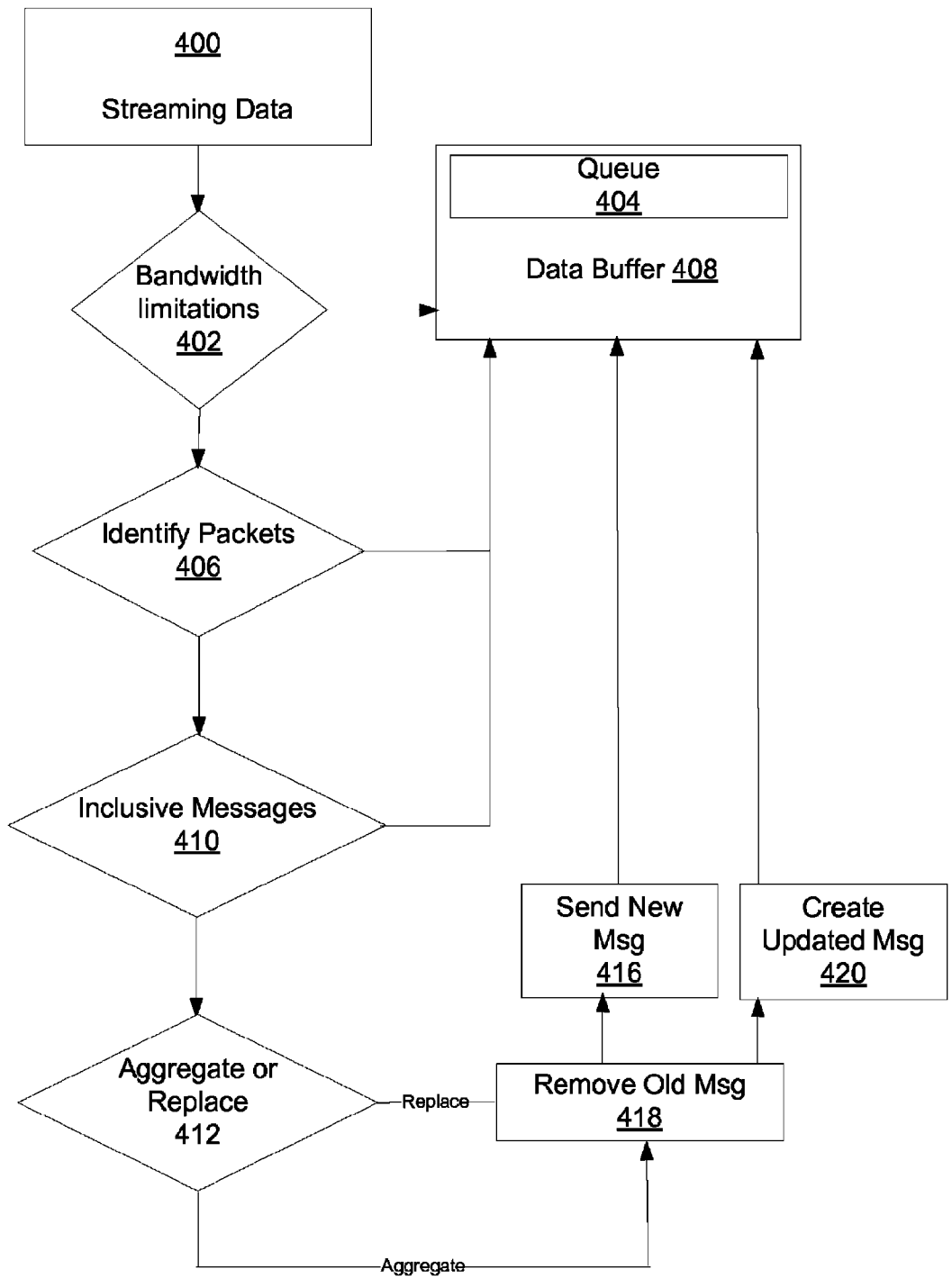
FIG. 4 shows a flow chart for implementing a system for distributing market data using dynamic filtering in accordance with the present invention.

FIG. 4 shows a flow chart that illustrates a method used to dynamically filter data to a business unit in accordance with an embodiment of the invention. As contemplated herein, a business unit can be any entity that requires a continuous stream of data being sent to it. Some examples of business units include recipients of data concerned with receiving current data over all the data in a stream, where the current data may replace or supplant the prior data in the data stream, including market data distributors and/or redistributors, ISV's, trading platform venders and other exchanges.

In FIG. 4, data 400 is continuously sent or published from a message buffer 408. The message buffer 408 may include a data queue from which the data is sent or published. The data 400 typically includes packets of information. The information may be associated with the needs of the business unit. The packets of information are preferably categorized into different forms of information, such as time, location, quantity, etc., depending on the nature of the business unit and the type of information being sent. As the data 400 is being sent, a determination 402 may be made as to whether the business unit has enough bandwidth to receive all or substantially all of the data 400 to be published. For example, if there is insufficient bandwidth to publish all data 400, the data 400 may be sent to the message buffer 408, where it may be placed in a message queue 404. The message buffer 408 may sequence the data 400 as it is received and publish the data.

Next, the data 400 is analyzed for preferred content 406. If one or more of the packets are categorized with a preferred category, those packets may be processed further. If none of the packets of information are considered to be preferred information, the data 400 is sent to the message buffer 408. The message buffer 408 may provide the information to the message queue 404 and publish the data as bandwidth becomes available.

If the packets of information are categorized as preferred, it is determined whether any other packets of information within the message queue 404 are also of the same category 410. If there are no packets of information with the same category within the message queue 404, the data 400 is sent to the data buffer 408, which may provide the information to the message queue 404 as bandwidth becomes available.

If the preferred packets of information are categorized with the same category as information categorized in the message queue 404, it is next determined whether the information within the message queue 404 should be filtered. For example, it may be determined whether the data 400 may be replaced, removed and/or aggregated with new or more recent information. If the information is to be replaced, the message with the old information may be removed 418 from the message queue 404 and the new message is sent 416 into the message queue 404. If the information is to be aggregated, the message with the old information is removed 518 from the message queue 404 and an updated message is created 420 utilizing information from the new message and the old message that was in the message queue 404. The updated message is then sent to the message queue 404. The new message 416 and the updated message may be placed in the message queue 404 at the location of the old data or at the location of the newer or more recent data.

Figure 5:
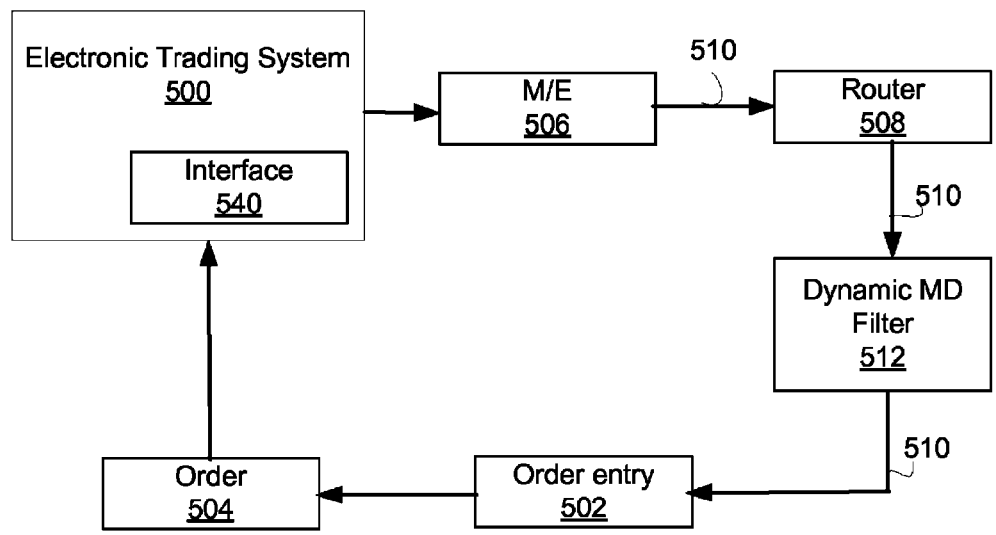
FIG. 5 shows a flow chart for a system for dynamically filtering market data, in accordance with the present invention.

FIG. 5 shows an exemplary system for dynamically filtering market data. The exemplary electronic trading system 500 may be associated with an exchange, such as the Globex® trading system. In an embodiment, the electronic trading system is a combination of globally distributed computers, controllers, servers, networks, gateways, routers, databases, memory, and other electronic data processing and routing devices. The trading system 500 may include a trading system interface 540 having devices configured to route incoming messages to an appropriate devices associated with the trading system. The trading system interface 540 may include computers, controllers, networks, gateways, routers and other electronic data processing and routing devices. Orders 504 that are placed by a trader 502 (or brokerage entity) with or submitted to the trading system 500 are received at the trading system interface 540. The trading system interface 540 routes the order 504 to an appropriate device.

Match engine 506 may be similar to match engine module 106 (shown in FIG. 1). The match engine 506 and trading system interface 540 may be separate and distinct modules or component or may be unitary parts. Match engine 506 is configured to match orders submitted to the trading system. The match engine 506 may match orders according to currently known or later developed trade matching practices and processes. In an embodiment, bids and orders are matched on price, at on a FIFO basis. The matching algorithm also may match orders on a pro-rata basis or combination of FIFO and pro rata basis. Other processes and/or matching processes may also be employed.

A market data router 508 is communicatively coupled with the match engine 506. The market data router 508 receives a market data stream 510 from the match engine 506. The market data router 508 distributes the market data stream 510. The market data stream 510 may be distributed within the electronic trading system 500 and outside of the electronic trading system 500. In the exemplary embodiment illustrated in FIG. 5, the market data stream 510 is distributed to a dynamic market data filter 512, which will filter information exceeding trader's 502 threshold to receive the market data stream 510.

The dynamic market data filter 512 monitors the rate of the incoming market data stream 510. The market data filter 512 compares the incoming rate to a threshold. The threshold may be associated with a bandwidth limitation for publishing market data. The threshold is preferably a maximum bandwidth, such as the maximum bandwidth of the trader 502. When the incoming rate exceeds the threshold, the incoming data are buffered, such as in a queue. The messages in the queue are evaluated to identify older/existing messages in the queue that can be replaced or aggregated with a newer message.

Various embodiments have been described and illustrated. However, the description and illustrations are by way of example only. Many more embodiments and implementations are possible within the scope of this invention and will be apparent to those of ordinary skill in the art. The various embodiments are not limited to the described environments, and can be applied to a wide variety of activities. For example, the invention may relate to streaming data used to determine a location in a global positioning device or an auto recovery system.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

What is claimed is:

1. A computer system comprising:
    an exchange computer system that includes a match engine module that matches orders for financial instruments and generates a stream of data;
    a processor programmed to execute a receiving thread to receive the stream of data, the stream of data characterized by a data streaming rate and including a plurality of consecutive messages;
    a data queue memory configured to buffer multiple messages in a sequence that the messages are received in response to the data streaming rate received at the processor programmed to execute a receiving thread exceeding a market data publishing limitation;
    a router coupled to the match engine module and configured to distribute streaming data;
    a dynamic market data filter configured to perform the following when the data streaming rate exceeds the market data publishing limitation:
        determine whether a new message in the stream of data contains data that is more current than data contained in an old message in the sequence of the messages in the data queue memory;
        remove the old message from the data queue memory when the new message contains more current data;
        create an updated message by aggregating data from the old message with data from the new message; and
        place the updated message in the data queue memory at the location of the removed old message in the sequence of messages stored in the data queue memory.

2. The computer system of claim 1 where the market data publishing limitation comprises any of a software limitation, hardware limitation, bandwidth limitation or any combinations thereof of the data recipient.

3. The computer system of claim 1 where the aggregator processor is further configured to determine whether the message in the stream of data is of a same category as any message in the data queue memory.

4. The computer system of claim 3 where a message in the data queue memory is removed when a message in the stream of data is of the same category of information as one or more messages in the data queue memory.

5. The system of claim 1, wherein the market data publishing limitation comprises a tier structure of market data publishing limitations.

6. The system of claim 1, wherein the market data publishing limitation comprises a dynamic tier structure of market data publishing limitations.

\* \* \* \* \*